United States Patent
Simonson et al.

(10) Patent No.: US 10,535,127 B1
(45) Date of Patent: Jan. 14, 2020

(54) APPARATUS, SYSTEM AND METHOD FOR HIGHLIGHTING ANOMALOUS CHANGE IN MULTI-PASS SYNTHETIC APERTURE RADAR IMAGERY

(71) Applicant: National Technology & Engineering Solutions of Sandia, LLC, Albuquerque, NM (US)

(72) Inventors: Katherine M. Simonson, Cedar Crest, MN (US); Ivan Lizarraga, Albuquerque, NM (US); David Nikolaus Perkins, Cleveland, OH (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 310 days.

(21) Appl. No.: 15/812,238

(22) Filed: Nov. 14, 2017

Related U.S. Application Data

(60) Provisional application No. 62/444,903, filed on Jan. 11, 2017.

(51) Int. Cl.
*G06T 7/00* (2017.01)
*G01S 13/90* (2006.01)
*G06T 7/33* (2017.01)

(52) U.S. Cl.
CPC .......... *G06T 7/0002* (2013.01); *G01S 13/90* (2013.01); *G06T 7/337* (2017.01); *G06T 2207/10024* (2013.01); *G06T 2207/10044* (2013.01)

(58) Field of Classification Search
CPC combination set(s) only.
See application file for complete search history.

(56) References Cited

U.S. PATENT DOCUMENTS

| | | |
|---|---|---|
| 7,912,321 B1 | 3/2011 | Simonson |
| 8,103,116 B1 | 1/2012 | Simonson et al. |
| 8,692,704 B1 | 4/2014 | Perkins et al. |
| 8,786,485 B2 | 7/2014 | Atkins et al. |
| 9,239,384 B1 | 1/2016 | Chow et al. |

(Continued)

OTHER PUBLICATIONS

G-Michael, "Statistically Normalized Coherent Change Detection for Synthetic Aperture Sonar Imagery", Proc. of SPIE, vol. 9823, Detection and Sensing of Mines, Explosive Objects, and Obscured Targets XXI, 98231T, May 3, 2016, pp. 1-13.

*Primary Examiner* — Mamadou L Diallo
(74) *Attorney, Agent, or Firm* — Madelynne J. Farber; Mark A. Dodd

(57) ABSTRACT

Described herein are various technologies relating to constructing a statistically-normalized coherence (SNC) image. A plurality of synthetic aperture radar (SAR) images of a scene are generated based upon radar signals directed towards and reflected off of the scene, and a plurality of coherence change detection (CCD) images of the scene are generated based upon the SAR images. The CCD images are registered with one another, and mean and variance are computed on a pixel-wise basis. A new CCD image is subsequently received, and registered with the plurality of CCD images. The SNC image is generated based upon the computed mean and variance values for each pixel in the registered CCD images, and further based upon values of pixels in the new CCD image. The SNC image identifies locations in the scene where anomalous activity is represented in the new CCD image.

20 Claims, 8 Drawing Sheets

(56) References Cited

U.S. PATENT DOCUMENTS

| | | | | |
|---|---|---|---|---|
| 10,042,048 B1* | 8/2018 | Moya | ............... | G01S 13/9023 |
| 10,345,440 B1* | 7/2019 | West | ............... | G01S 13/9027 |
| 2011/0299733 A1* | 12/2011 | Jahangir | ............ | G01S 13/9023 |
| | | | | 382/103 |
| 2012/0319893 A1* | 12/2012 | Yun | ............... | G01S 13/9023 |
| | | | | 342/25 C |
| 2018/0172824 A1* | 6/2018 | Beckett | ............ | G06K 9/6267 |

* cited by examiner

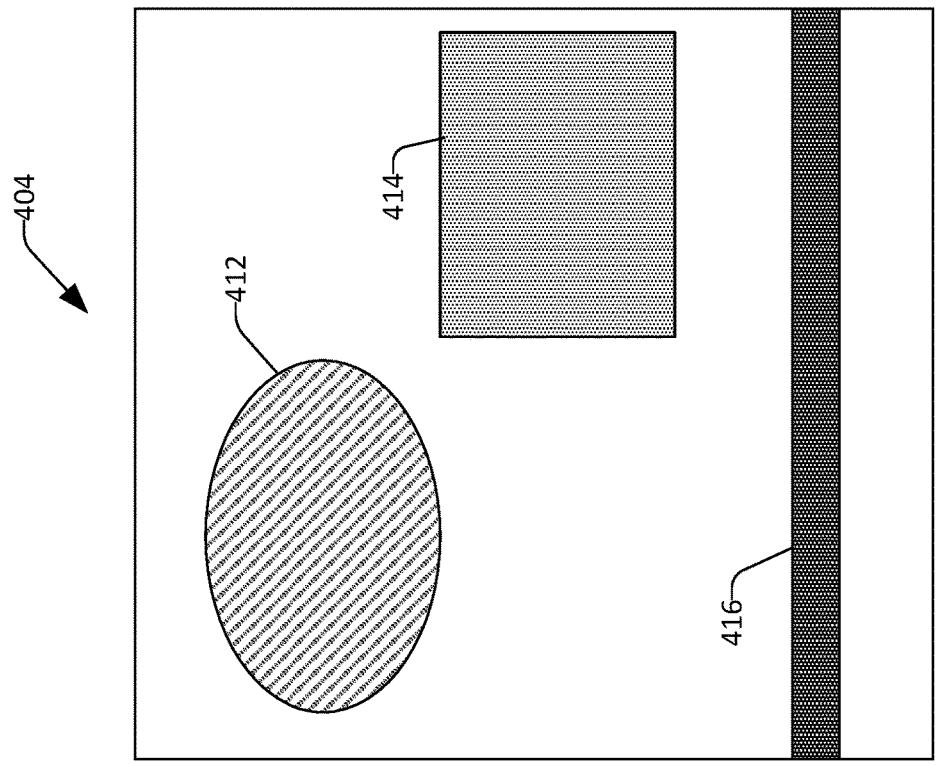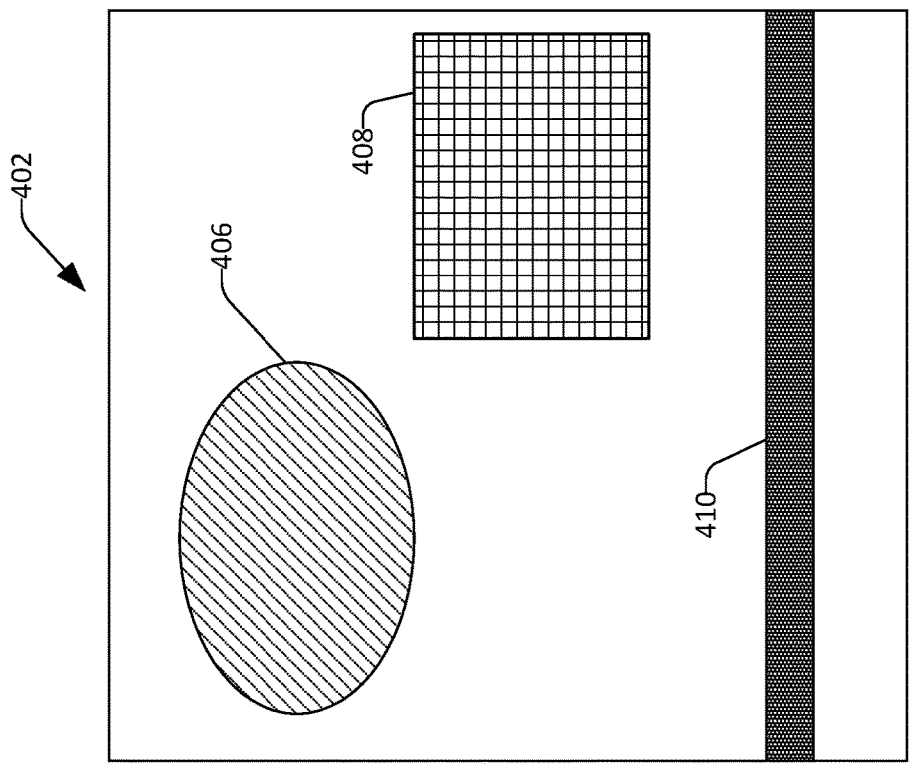
FIG. 4

APPARATUS, SYSTEM AND METHOD FOR HIGHLIGHTING ANOMALOUS CHANGE IN MULTI-PASS SYNTHETIC APERTURE RADAR IMAGERY

RELATED APPLICATION

This application claims priority to U.S. Provisional Patent Application No. 62/444,903, filed on Jan. 11, 2017, and entitled "APPARATUS, SYSTEM AND METHOD FOR HIGHLIGHTING ANOMALOUS CHANGE IN MULTI-PASS SYNTHETIC APERTURE RADAR IMAGERY", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

Synthetic aperture radar (SAR) systems can be employed to generate SAR images of a scene. Summarily, a SAR system comprises a radar transmitter and a radar receiver placed in an aircraft that passes by a scene of interest. During a pass by the scene, the radar transmitter directs radar signals towards the scene, wherein the radar signals reflect from the scene, and the radar transmitter detects the reflected radar signals. A computing system is in communication with the radar receiver, and the computing system constructs a SAR image of the scene based upon the reflected radar signals detected by the radar receiver during the pass by the scene. SAR images exhibit advantages over optical images in certain respects. For instance, radar signals emitted by the radar transmitter and received by the radar receiver can pass through cloud cover. Additionally, the SAR system can generate images of a scene at night. Still further, SAR images exhibit details that do not appear in optical images. For instance, a SAR image can depict gradations of texture (e.g., coarse to fine gravel), which are typically not able to be ascertained in optical images.

Coherent change detection (CCD) images can be generated based upon complex-valued SAR images. With more specificity, a CCD image can be generated based upon a pair of finely registered SAR images of a scene corresponding to two passes by the scene, wherein the CCD image depicts alterations in the scene that have occurred between the two passes. Stated differently, a CCD image can reveal subtle rearrangements of scatterers that are present in a single resolution cell of a complex SAR image. Each element (pixel value) in a CCD image is a realization of the sample coherence magnitude function computed over a centered local window of pixels. The sample coherence magnitude, often denoted $\hat{\gamma}$ %, varies between 0 and 1. Pixels with low values indicate locations in a scene where complex change has occurred between two SAR passes by the scene used to generate the CCD image, and values close to unity are found in pixels corresponding to unchanged scene elements.

CCD images have been identified as being useful for showing human-induced change phenomenon, including vehicle tracks on a gravel road, soil displacements caused by a rotary hoe, and mowing of grass. Highlighting these changes for an analyst tasked with monitoring the scene over time can assist the analysts in determining how busy the scene has been between two SAR passes, and whether any objects of interest (vehicles, sheds, crates) have been repositioned between the two SAR passes. It can be ascertained, however, that not all areas of low coherence in a CCD image correspond to locations where human-induced change has occurred. For example, a CCD image may include pixels containing SAR shadows, standing water, or vegetation, which also typically experience a loss of phase coherence between SAR passes. When a CCD image includes several regions of low phase coherence, the analysts may be visually overwhelmed, particularly for highly cluttered scenes. In addition to the challenge posed by scene clutter, normal human activities in a region of interest may mask change signatures that are of interest to the analyst. Therefore, while CCD images may be helpful to an analyst who is tasked with monitoring the scene, the CCD images may not be ideal due to the CCD images depicting human activities that may be routine, as well as potentially depicting a significant amount of clutter.

SUMMARY

The following is a brief summary of subject matter that is described in greater detail herein. This summary is not intended to be limiting as to the scope of the claims.

Described herein are various technologies pertaining to the generation of an image (referred to herein as a statistically-normalized coherence (SNC) image), wherein the SNC image is designed to identify locations in a scene where unexpected change has occurred and/or where expected change has not occurred. An analyst, then, when reviewing this image, may be able to relatively quickly determine whether further investigation is necessary as to activity (or lack of activity) in the scene. The SNC can indicate, for example, that a vehicle has taken a path through the scene that the vehicle (or other vehicles) has previously not taken. The SNC image fails to include clutter associated with corresponding CCD images of the scene, thereby allowing the analysts to quickly understand areas of the scene that are of interest to the analyst.

The SNC image is based upon a plurality of CCD images, which in turn are based upon a plurality of SAR images. Generation of an SNC image is now described. An aircraft (e.g., airplane, unmanned aerial vehicle (UAV), or the like) includes a SAR system, which comprises a radar transmitter, a radar receiver, and a computing device that is electrically coupled to the radar transmitter and the radar receiver. The aircraft is directed to pass by a scene of interest (a scene being monitored by an analyst) multiple times, where the imaging geometry and radar settings are nearly identical for each pass by the scene, and further where the computing device generates a SAR image for each pass of the aircraft by the scene.

The computing device generates a plurality of CCD images based upon the SAR images of the scene. As indicated previously, a CCD image of the scene is generated based upon a pair of SAR images. Therefore, in an example, the computing device can generate several CCD images, one for each consecutive pair of SAR images in the plurality of SAR images. The computing device registers the plurality of CCD images with one another, thereby creating a CCD image stack. The registration process aligns the CCD images such that pixel (i, j), for each CCD image in the CCD image stack, is coarsely aligned with the same patch of ground in the scene.

The computing device then calculates, on a pixel-wise basis, mean and variance of sample coherence across the CCD image stack. In other words, the computing device calculates the mean and variance of the sample coherence magnitude for each pixel across the CCD image stack. The mean and variance can be employed to gauge the level of change expected to be observed at pixel (i, j) (across all pixels in the CCD image stack). Pixels with a large mean coherence (close to unity) and a low standard deviation (near 0) are aligned with scene locations where change is rare. Pixels with a low mean coherence and moderate standard deviation represent SAR shadows, water, vegetation, or places where human or livestock activity is ubiquitous. Pixels with a moderate mean coherence and a high standard deviation are aligned with locations in the scene where change patterns are irregular. Examples of irregular change patterns include agricultural fields that are irrigated intermittently and pathways that are often (but not always) traversed by foot or vehicle traffic.

The SNC image is generated through use of the mean coherence and variance values. For example, when the aircraft most recently passes by the scene and generates a new SAR image of the scene, a new CCD image of the scene can be generated based upon the new SAR image and a previous (e.g., most recently generated) SAR image. This new CCD image can be registered with the CCD image stack, such that pixel (i, j) of the new and registered CCD image is aligned with the same scene location as pixels (i, j) of the CCD images in the CCD image stack. The coherence value for each pixel in the new CCD image is compared to the mean value for the corresponding pixel in the CCD image stack, and based upon this comparison, as well as the variance for that pixel, an SNC value for each pixel of the resultant SNC image can be computed. More specifically, the SNC value for pixel (i, j) of the resultant SNC image can be computed by subtracting the mean coherence value for pixel (i, j) across the CCD image stack from the coherence value in the new CCD image, and dividing the result by the square root of the variance (the standard deviation) for pixel (i, j) across the CCD image stack. The pixel values for the SNC image, then, are expressed in units of standard deviations above or below the mean coherence estimate. A negative value for pixel (i, j) corresponds to a location where coherence between two passes was lower than expected at the scene location to which pixel (i, j) is aligned, while a positive value indicates higher coherence than was observed across pixel (i, j) in the CCD image stack. These values can be plotted in the SNC image, where the further away the value is from 0, the more highlighting that is applied to that pixel. A larger absolute value for pixel (i, j) in the SNC image indicates that some unexpected change or unexpected lack of change is captured in the new CCD image.

The mean and variance estimates can be updated over time, as additional CCD images of the scene are generated. In a nonlimiting example, the estimates can be generated based upon ten CCD images, where older CCD images are no longer used for computing the estimates. Further, some threshold number of most recently-generated CCD images may also not be used for computing the estimates. Other techniques for choosing which CCD images to include in the CCD image stack used to compute the aforementioned mean and variance are also contemplated. For instance, only CCD images with sufficiently high quality generated based upon SAR images captured during certain windows in time, over the course of days, can be used. In other words, human activity levels vary throughout the diurnal cycle and, therefore, some changes observed during the day may be different than those observed at night; thus, CCD images used to compute the above-referenced estimates may be limited to those captured during certain hours of a day (or night).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 4 illustrates two exemplary SAR images of a scene.

DETAILED DESCRIPTION

Figure 1:
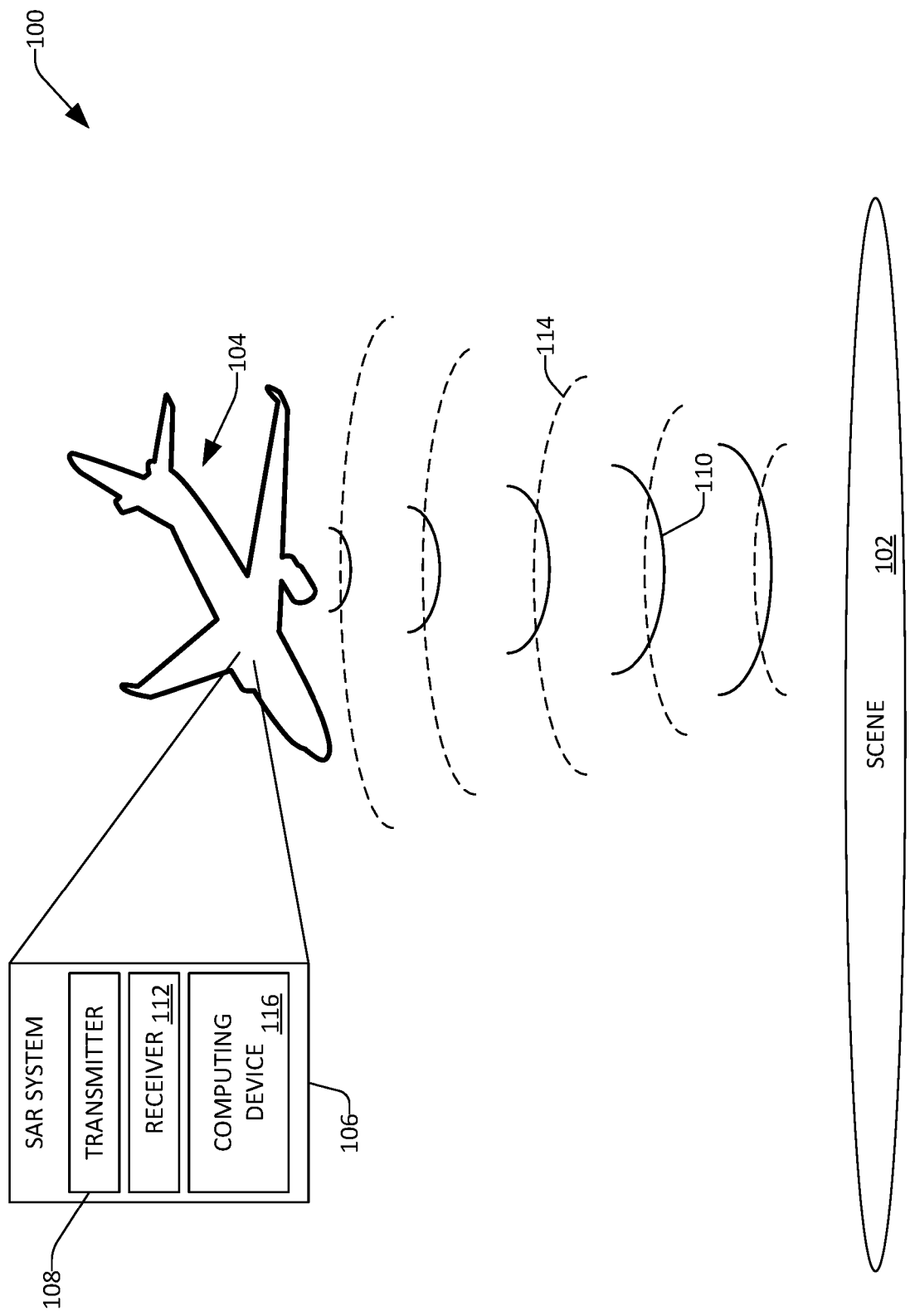
FIG. 1 is a schematic that illustrates a SAR system constructing SAR images of a scene.

Various technologies pertaining to generating SNC images and highlighting locations in a scene that may be of interest to an analysis based upon the SNC images are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference now to FIG. 1, an exemplary system 100 that is configured to construct an SNC image of a scene 102 is illustrated. The system 100 includes an aircraft 104 that comprises a SAR system 106. The aircraft 104 can be an airplane, an unmanned aeronautical vehicle (UAV), a helicopter, a satellite, etc. The SAR system 106 includes a radar transmitter 108 that is configured to emit radar signals 110 (shown in solid line) towards the scene 102. For instance, the radar transmitter 108 includes a transmit antenna that is energized to cause the radar signals 110 to be emitted from the transmitter 108 towards the scene 102. The SAR system 106 also includes a radar receiver 112 that is configured to detect radar signals 114 (shown in dashed line) that have reflected from the scene 102. The SAR system 106 also comprises a computing device 116 that is in communication with the radar transmitter 108 and the radar receiver 112. The computing device 116 is configured to transmit control signals to the radar transmitter 108, wherein the radar transmitter 108 transmits the radar signals 110 based upon the control signals. The computing device 116 is further configured to receive electrical signals from the radar receiver 112, wherein the electrical signals are representative of the radar signals 114 detected by the radar receiver 112. The computing device 116 is additionally configured to generate an SNC image of the scene 102, wherein the SNC image of the scene 102 depicts at least one of a) locations in the scene 102 where change has occurred that is unexpected and/or b) locations in the scene 102 where change is expected, but no change is observed. This type of information is particularly useful for an analyst who is tasked with monitoring the scene 102. While the computing device 116 is illustrated as being co-located with the radar transmitter 108 and the radar receiver 112, it is to be understood that at least some functionality described as being performed by the computing device 116 may be performed at a ground station.

Figure 2:
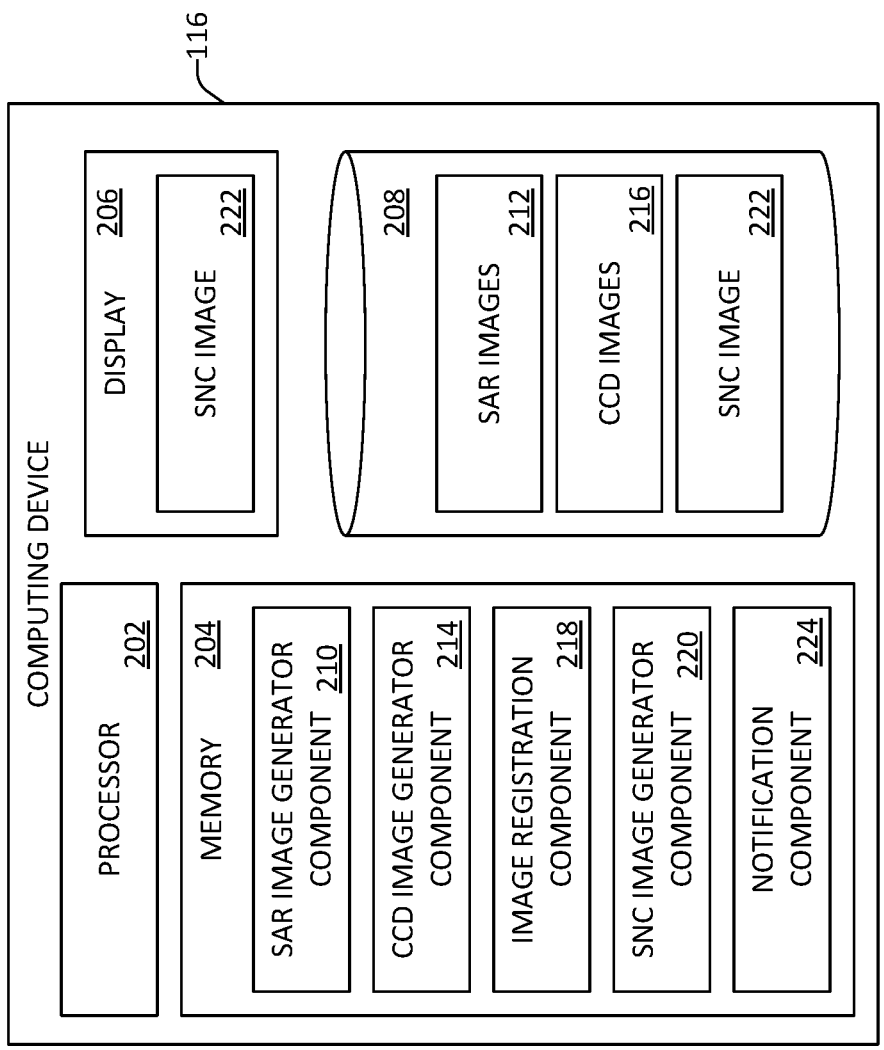
FIG. 2 is a functional block diagram of an exemplary computing device that is configured to construct an SNC image.

Now referring to FIG. 2, a functional block diagram of the computing device 116 of the SAR system 106 is illustrated. The computing device 116 includes a processor 202, memory 204 operably coupled to the processor 202, a display 206 operably coupled to the processor 202, and a data store 208 operably coupled to the processor 202. The memory 204 includes a plurality of components that are executed by the processor 202. With more specificity, the memory 204 includes a SAR image generator component 210 that is configured to generate a SAR image for each SAR pass of the aircraft 104 by the scene 102. A SAR pass by the scene 102 occurs when the aircraft 104 flies by the scene 102, the radar transmitter 108 emits radar signals towards the scene 102, and the radar receiver 112 detects radar signals 114 that have been reflected from the scene 102. Further, for each SAR pass, the SAR system 106 can have equivalent radar settings and approximately equivalent imaging geometry (i.e., the location and orientation of the aircraft 104 relative to the scene 102 is approximately equivalent for each SAR pass). Accordingly, the SAR image generator component 210 generates a plurality of SAR images 212, which can be retained in the data store 208. Each SAR image in the SAR images 212 can be assigned a timestamp that is indicative of when the SAR image was generated, and accordingly, the SAR images 212 can be arranged in sequence based upon the timestamps assigned thereto. These SAR images can be denoted as $SAR_1$ (the first SAR image in the SAR images 212), $SAR_2$ (the second SAR image in the SAR images 212), . . . $SAR_N$.

The memory 204 also includes a CCD image generator component 214 that constructs a plurality of CCD images 216 based upon the plurality of SAR images 212, wherein the CCD image generator component 214 causes the CCD images 214 to be stored in the data store 208. As noted previously, the CCD image generator component 214 generates a CCD image based upon a pair of SAR images in the SAR images 212 (e.g., a pair of consecutive SAR images in a sequence of SAR images that are ordered based upon the timestamps assigned thereto). Therefore, in an example, if the plurality of SAR images 212 includes 11 SAR images, the CCD image generator component 214 can generate 10 CCD images. The CCD images 216 can be denoted as $CCD_{1,2}$ (a CCD image generated based upon $SAR_1$ and $SAR_2$), $CCD_{2,3}$ (a CCD image generated based upon $SAR_2$ and $SAR_3$), and so forth.

Figure 3:
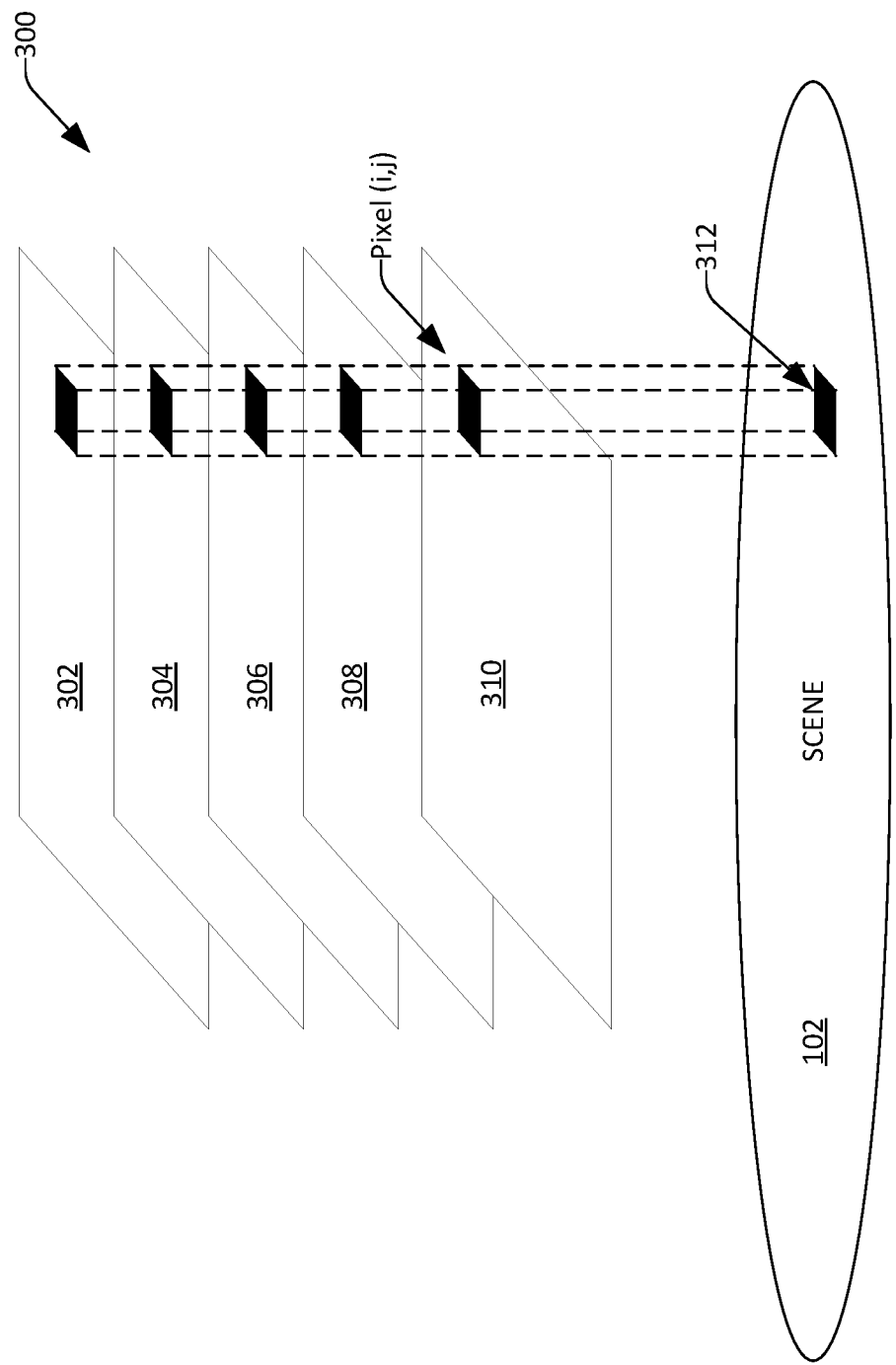
FIG. 3 depicts a registered stack of CCD images.

The computing device 116 also includes an image registration component 218 that registers the CCD images 216 in the data store 208 with one another to create a CCD image stack. In an example, the CCD image stack can include at least six CCD images. Once the CCD images are registered to one another, pixel (i, j) in each CCD image in the CCD image stack is aligned with the same portion of the scene 102. Turning briefly to FIG. 3, a schematic illustrating an exemplary CCD image stack 300 is depicted. The exemplary CCD image stack 300 includes five CCD images 302-310. As can be ascertained, pixel (i, j) in each of the CCD images 302-310 aligns with the same portion 312 of the scene 102. While the image registration component 218 has been described as registering the CCD images 216 with one another after the CCD image generator component 214 has generated the plurality of CCD images 216, in another exemplary embodiment, the image registration component 218 can register the plurality of SAR images 212 to one another prior to the CCD image generator component 214 generating the CCD images 216. In such an embodiment, since the SAR images 210 are already registered with one another, the resultant CCD images 214 will likewise be registered with one another.

Returning to FIG. 2, the computing device 116 additionally includes an SNC image generator component 220 that is configured to construct an SNC image 222 based upon the plurality of CCD images 216 and cause the SNC image 222 to be stored in the data store 208 and displayed on the display 206. In summary, the SNC image generator component 220, when generating the SNC image 222, is configured to perform the following acts: 1) compute, for each pixel (i, j) across the CCD image stack, a mean coherence value for such pixel; 2) compute, for each pixel (i, j) across the CCD image stack, variance for such pixel; 3) receive a new CCD image; 4) cause the new CCD image to be registered with the CCD images in the image stack; 5) compute, for each pixel (i, j) in the resultant SNC image 222, an SNC value, wherein the SNC generator component 220 computes the SNC value based upon: a) the previously computed mean coherence value for pixel (i, j) across the CCD image stack; b) the variance for pixel (i, j) across the CCD image stack; and c) the coherence value for pixel (i, j) of the new CCD image. Once the SNC image generator component 220 has computed an SNC value for each pixel in the SNC image 222, the SNC image generator component 220 can cause the SNC image 222 to be presented on the display 206 to an analyst. The resultant SNC image 222 is highlighted, to the analyst, locations in the scene 102 captured in the new CCD image where unexpected change has occurred, and further highlights locations in the scene 102 captured in the new CCD image where expected change has not occurred.

Turning to FIG. 4, a pair of SAR images 402 and 404 of the scene 102 are illustrated. The first SAR image 402 was generated during a first SAR pass of the aircraft 104 by the scene 102, while the second SAR image 404 was generated during a second SAR pass of the aircraft 104 by the scene 102. The first SAR image 402 comprises a first region 406 that corresponds to a forested area in the scene 102, a second region 408 that corresponds to a body of water in the scene 102, and a third region 410 that corresponds to a dirt road in the scene 102. The second SAR image 404 comprises a first region 412 that corresponds to the forested area, a second region 414 that corresponds to the body of water, and a third region 416 that corresponds to a the dirt road in the scene 102. It can be ascertained that while the regions 406 and 412 of the SAR images 402 and 404, respectively, correspond to the same forested area, the regions 406 and 412 are not identical, due to leaves rustling in the forested area. Similarly, while the regions 408 and 414 of the SAR images 402 and 404, respectively correspond to the same body of water, the regions 408 and 414 are also not identical, due to rippling of water being different between the two SAR passes for the images 402 and 404.

Figure 6:
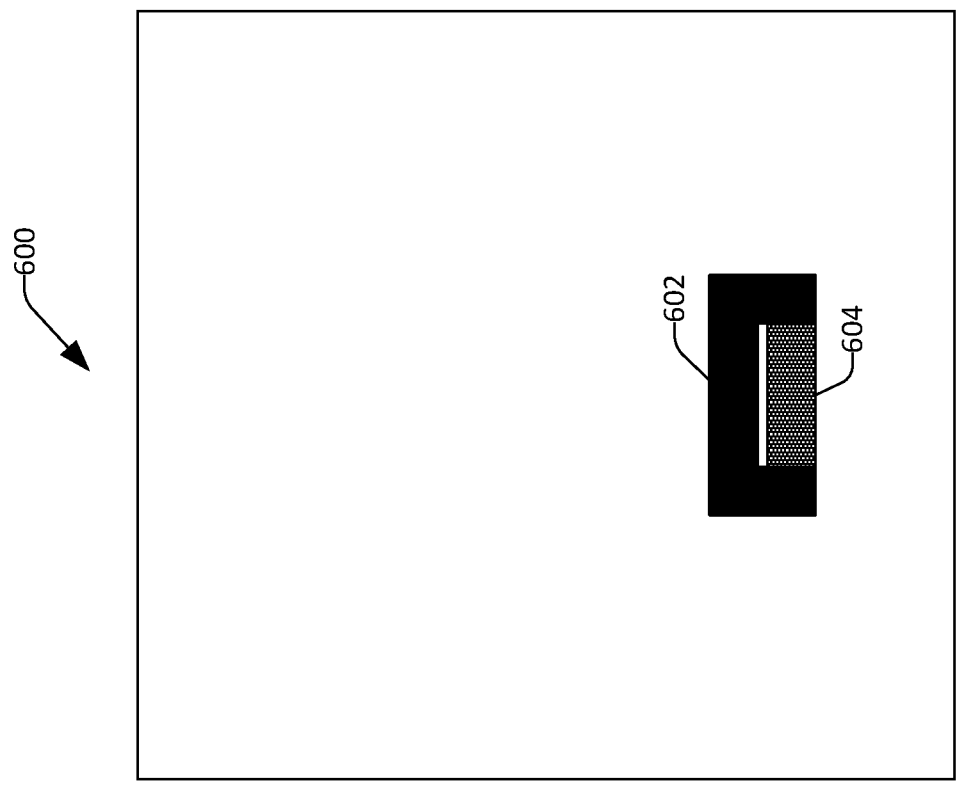
FIG. 6 illustrates an exemplary SNC image of the scene that is computed based upon the CCD image of the scene shown in FIG. 5, and computed mean and variance values for other registered CCD images of the scene.
Figure 5:
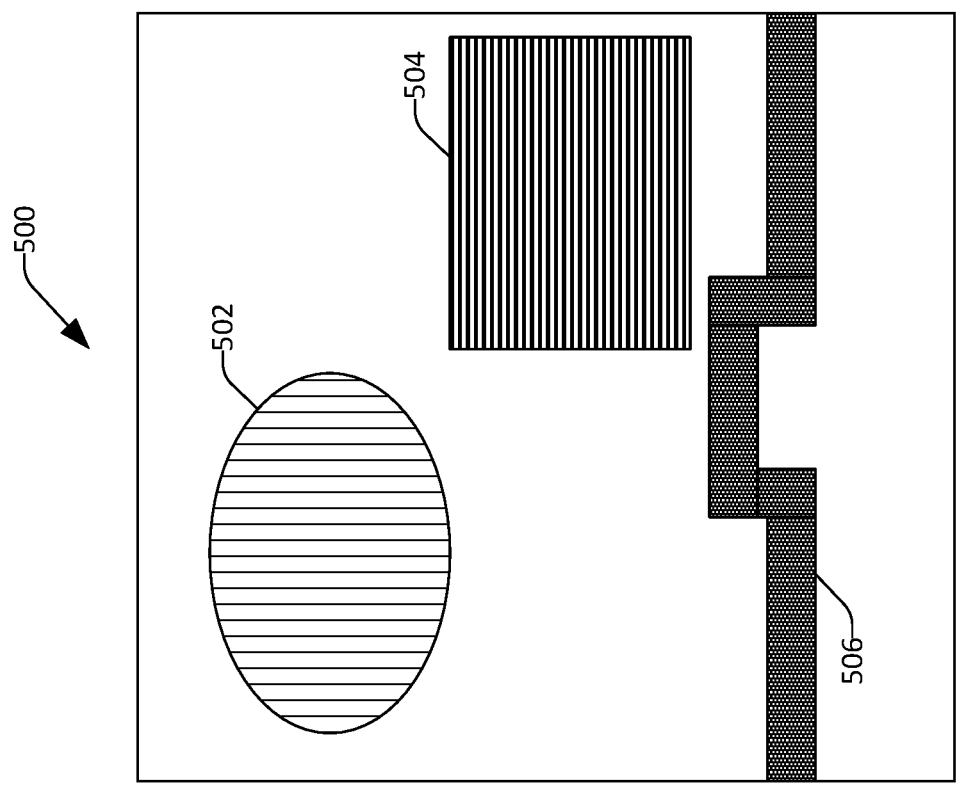
FIG. 5 depicts an exemplary CCD image of the scene based upon the SAR images shown in FIG. 4.

Now referring to FIG. 5, an exemplary CCD image 500 that is generated by the CCD image generator component 214 based upon the SAR images 402 and 404 is illustrated. The CCD image 500 includes regions 502 and 504 that correspond to the leaved forest and the body of water represented in the SAR images 402 and 404. The CCD image 500 depicts these aspects due to coherence changes between the regions 406 and 412 and between the regions 408 and 414 in the images 402 and 404, respectively. The CCD image 500 also illustrates a region 506 where there is a change in activity patterns between the first SAR image 402 and the second SAR image 404. In other words, the region 506 in the CCD image 500 identifies a region in the scene 102 where a change of the vehicle track position has occurred between the SAR images 402 and 404. Thus, at least one vehicle, rather than staying on the road depicted in the SAR images 402 and 404, has left the road and disturbed an area of the ground that is not on the road. In addition, no vehicles have traversed the section of the road itself that is nearest to this diversion point. In the CCD image 500, however, an analyst may have difficulty identifying this change in activity, due to clutter in the CCD image 500 (e.g., the regions 502 and 504 being included in the CCD image 500, even though the rustling of leaves and the rippling of water are unlikely to be of interest to the analyst). Referring briefly to FIG. 6, an exemplary SNC image 600 is illustrated, where the SNC image 600 fails to depict regions of change in the scene 102 where change is expected (and also fails to depict regions of lack of change in the scene 102 where such lack of change is expected). Therefore, the SNC image 600 does not include regions corresponding to the leaved forest and the body of water, as change in coherence is expected in such regions. Nor does the SNC image 600 depict vehicle tracks where such vehicle tracks would be expected to exist (based upon vehicle track activity depicted in other CCD images of the scene 102). Hence, the analyst may review the SNC image 600 and immediately identify a region 602 corresponding to a location in the scene 102 were unexpected change has occurred. Further, the analyst may review the SNC image 600 and immediately identify a region 604 corresponding to a location in the scene 102 where there is an unexpected lack of change (i.e., vehicles normally travel over the location in the scene 102 corresponding to the region 604, and therefore the lack of a vehicle traveling over such location is anomalous).

Returning again to FIG. 2, operation of the SNC image generator component 220 is set forth in greater detail. For purposes of nomenclature, $CCD_{K,K+1}$ refers to a CCD image generated by the CCD image generator component 214 based upon SAR image $SAR_K$ and SAR image $SAR_{K+1}$ generated by the SAR image generator component 210. As noted previously, the SNC image generator component 220 computes the mean coherence value for each pixel (i, j) across the CCD image stack. $\hat{\gamma}_{ij}(k,k+1)$ can denote the sample coherence magnitude at pixel (i, j) of $CCD_{K,K+1}$. Therefore, the mean coherence value for pixel (i, j) across all images in the CCD image stack is given by the following:

$$\hat{\mu}_{ij} = \frac{1}{K}\sum_{k=1}^{K} \hat{\gamma}_{ij}(k, k+1); \qquad (1)$$

Additionally, the SNC image generator component 220 is configured to compute the variance on a pixel-wise basis through the CCD images in the CCD image stack. Therefore, the variance computed by the SNC image generator component 220 can be computed based upon the following:

$$\hat{\sigma}_{ij}^2 = \frac{1}{K-1}\sum_{k=1}^{K} [\hat{\gamma}_{ij}(k, k+1) - \hat{\mu}_{ij}]^2, \qquad (2)$$

where K is the total number of CCD images in the CCD image stack.

Together, the quantities $\hat{\alpha}_{ij}$ and $\hat{\sigma}_{ij}^2$ help gauge the level of change expected to be observed in the scene 102 that is aligned with pixel (i, j). Pixels with a large mean coherence (close to unity) and a low standard deviation (near 0) correspond to locations in the scene 102 where change is rare. Pixels with a low mean coherence and moderate standard deviation generally represent SAR shadows, water, vegetation, or places where human or livestock activity is ubiquitous. Pixels with a moderate mean and a high standard deviation correspond to locations in the scene 102 were change patterns are irregular. Examples include agricultural fields that are irrigated intermittently, pathways that are often, but not always, traversed by foot, vehicle traffic, and so forth.

The SNC image generator component 220 can calculate different sets of moment estimates (mean coherence and variance) for daytime and nighttime change patterns, since human activity levels vary throughout the diurnal cycle. Further, because normal activity patterns gradually change with the seasons, the SNC image generator component 220 can update the computed mean and variance values somewhat regularly. In a nonlimiting example, the SNC image generator component 220 can compute daytime and nighttime values of $\hat{\alpha}_{ij}$ and $\hat{\sigma}_{ij}^2$ based on a running time window of CCD images (e.g., CCD images in a running time window that illustrate daytime changes in the scene 102 can be used by the SNC image generator component 220 when computing the mean coherence and variance values).

Once the SNC image generator component 220 has computed the mean coherence and variance values for the CCD images in the CCD image stack, the SNC image generator component 220 can receive a new CCD image ($CCD_{M,M+1}$) and register this new CCD image to the CCD image stack that was used to compute the mean and variance values. The SNC image generator component 220 may then perform a pixel-wise computation to generate a value for each pixel in the resultant SNC image 222, wherein this value for pixel (i, j) is based upon the coherence value for pixel (i, j) in $CCD_{M,M+1}$, the mean coherence value for pixel (i, j) previously computed by the SNC generator component 220, and the variance of the coherence values for pixel (i, j) across the CCD images in the CCD image stack. With more particularly, if $CCD_{M,M+1}$ is a matrix of coherence values observed between the Mth and M+1$^{st}$ SAR passes in the sequence, then for pixel (i, j) in such matrix, the SNC formulation can be as follows.

$$SNC_{ij}(m, m+1) = \frac{\hat{\gamma}_{ij}(m, m+1) - \hat{\mu}_{ij}}{\hat{\sigma}_{ij}}. \quad (3)$$

The full matrix of values is denoted SNC (M, M+1). The elements of this matrix (of the SNC image 222) are expressed in units of standard deviations above or below the mean coherence estimate. Negative values correspond to regions in $CCD_{M,M+1}$ where coherence between passes M and M+1 was lower than expected, while positive values indicate a higher coherence than was observed during a training period when the CCD images in the CCD image stack were captured.

The SNC image generator component 220 can employ various techniques when causing the SNC image 222 to be shown on the display 206. In an example, the SNC image generator component 220 can generate the SNC image 222 such that only negative SNC values are depicted in the SNC image 222 (e.g., only regions corresponding to locations in the scene 102 where unexpected change has occurred are illustrated in the SNC image 222). The SNC image generator component 220 may alternatively generate the SNC image 222 such that only positive values are depicted in the SNC image 222. In yet another example, the SNC image generator component 220 can depict different colors for positive and negative values, such that the SNC image 222 identifies both locations in the scene 102 where unexpected change has occurred, as well as locations in the scene 102 where expected change has not occurred. Other techniques are also contemplated.

The memory 204 also includes a notification component 224 that is configured to notify the analyst, for example, when the SNC image 222 exhibits some unexpected change or lack of unexpected change. For instance, when a threshold number of pixels in the SNC image 222 have a value over 2, the notification component 224 can transmit a notification to the analyst such that the analyst understands to closely review the resultant SNC image 222.

Figure 7:
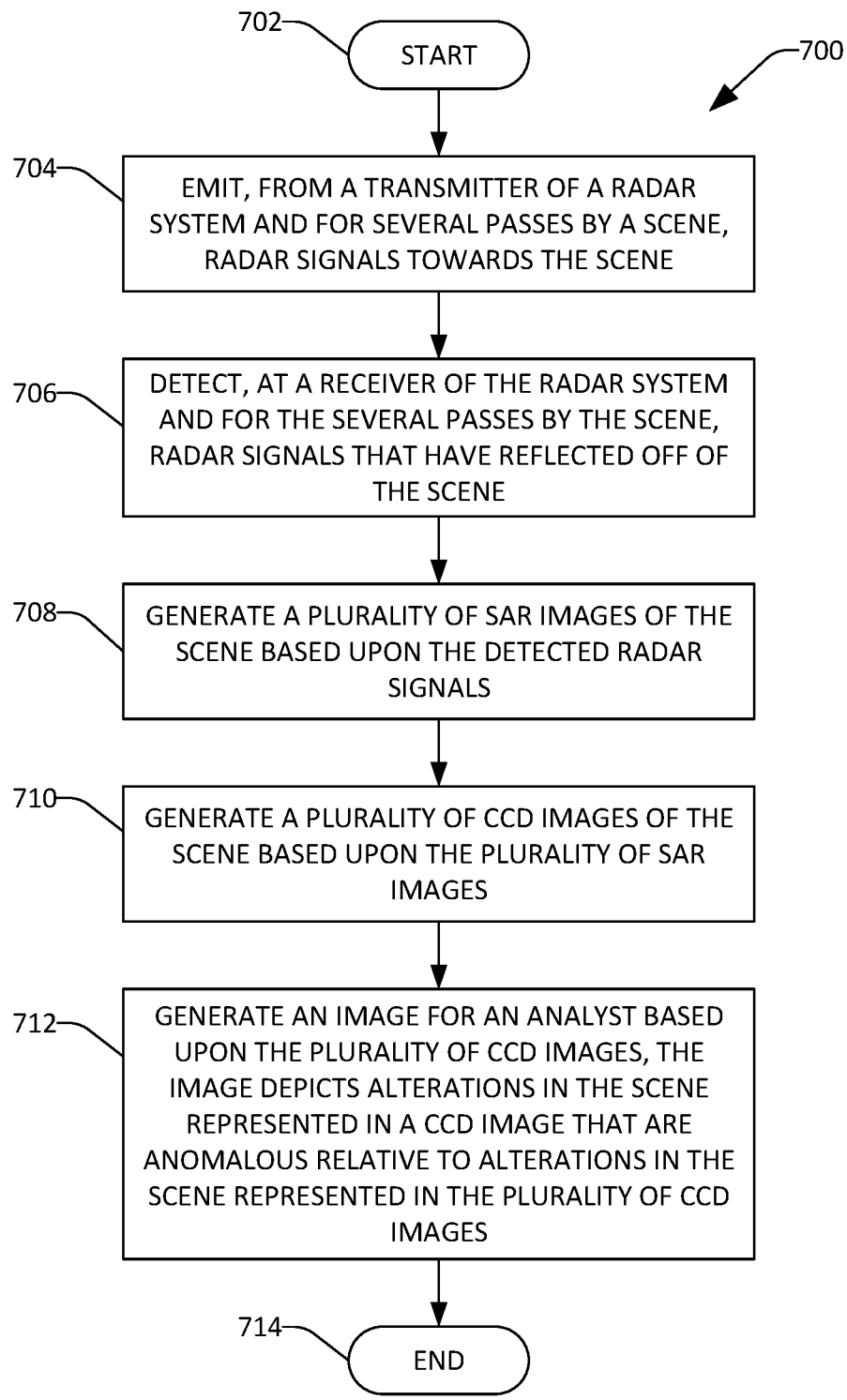
FIG. 7 is a flow diagram illustrating an exemplary methodology for generating an SNC image.
Figure 8:
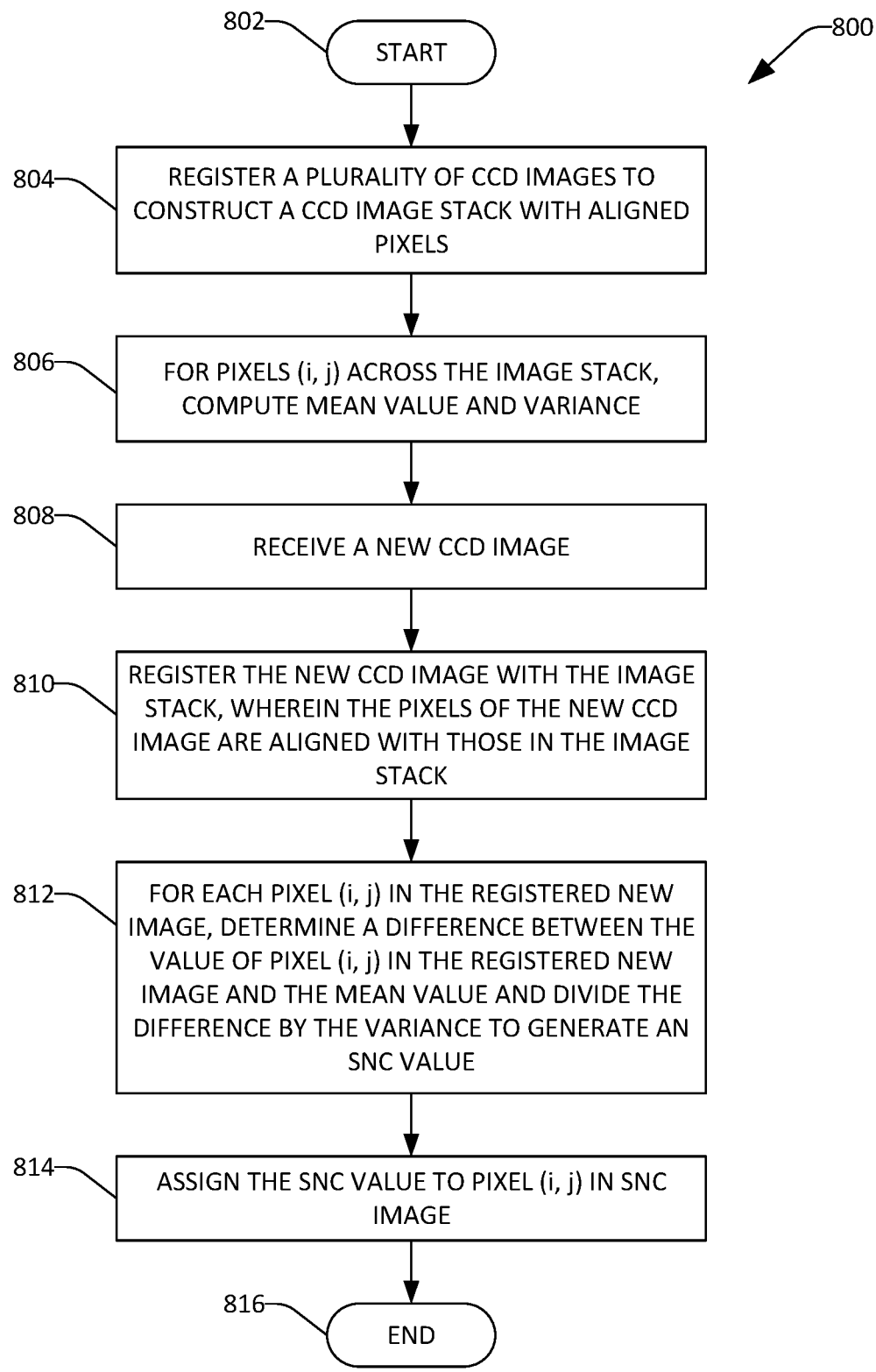
FIG. 8 is a flow diagram illustrating an exemplary methodology for generating an SNC image based upon a pixel-wise computation of mean and variance for coherence values for pixels of registered CCD images in a CCD image stack.

FIGS. 7-8 illustrate exemplary methodologies relating to constructing and displaying an SNC image. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Referring now to FIG. 7, an exemplary methodology 700 for constructing an SNC image is illustrated. The methodology 700 starts at 702, and at 704, radar signals are emitted from a transmitter of a radar system, for several passes by a scene, towards the scene. As noted previously, the transmitter of the radar system is included in an aircraft that passes by the scene from time to time.

The 706, a receiver of the radar system, for the several passes by the scene, detects radar signals that are reflected off the scene. At 708, a plurality of SAR images of the scene are generated based upon the detected radar signals; one SAR image for each pass over the scene.

At 710, a plurality of CCD images of the scene are generated based upon the plurality of SAR images. As noted above, $CCD_{K,K+1}$ can be generated based upon $SAR_K$ and $SAR_{K+1}$.

At 712, an image for analysis (an SNC image) is generated based upon the plurality of CCD images, wherein the SNC image identifies locations in the scene where change represented in the CCD image has occurred anomalously and/or where change has not occurred but is expected to occur. The methodology 700 completes at 714.

Now turning to FIG. 8, an exemplary methodology 800 for assigning values to pixels of an SNC image is illustrated. The methodology 800 starts at 802, and at 804, a plurality of CCD images are registered to one another to construct a CCD image stack with aligned pixels, wherein, for example, pixel (i, j) of each of CCD image in the CCD image stack is aligned with the same portion of a scene captured in SAR images upon which the CCD images are based. At 806, for pixels (i, j) across the CCD image stack, a mean coherence value and variance value are computed. At 808, a new CCD image is received, and at 810, the new CCD image is registered with the CCD image stack such that pixels of the new CCD are aligned with pixels of each CCD image in the CCD image stack. At 812, for each pixel (i, j) in the registered new CCD image, a difference between the value of pixel (i, j) in the registered new CCD image and the mean value is determined, and the result is divided by the standard deviation to generate an SNC value. At 814, the SNC value is assigned to pixel (i, j) in the SNC image, such that each pixel in the SNC image is assigned an SNC value. The methodology 800 completes at 816.

Figure 9:
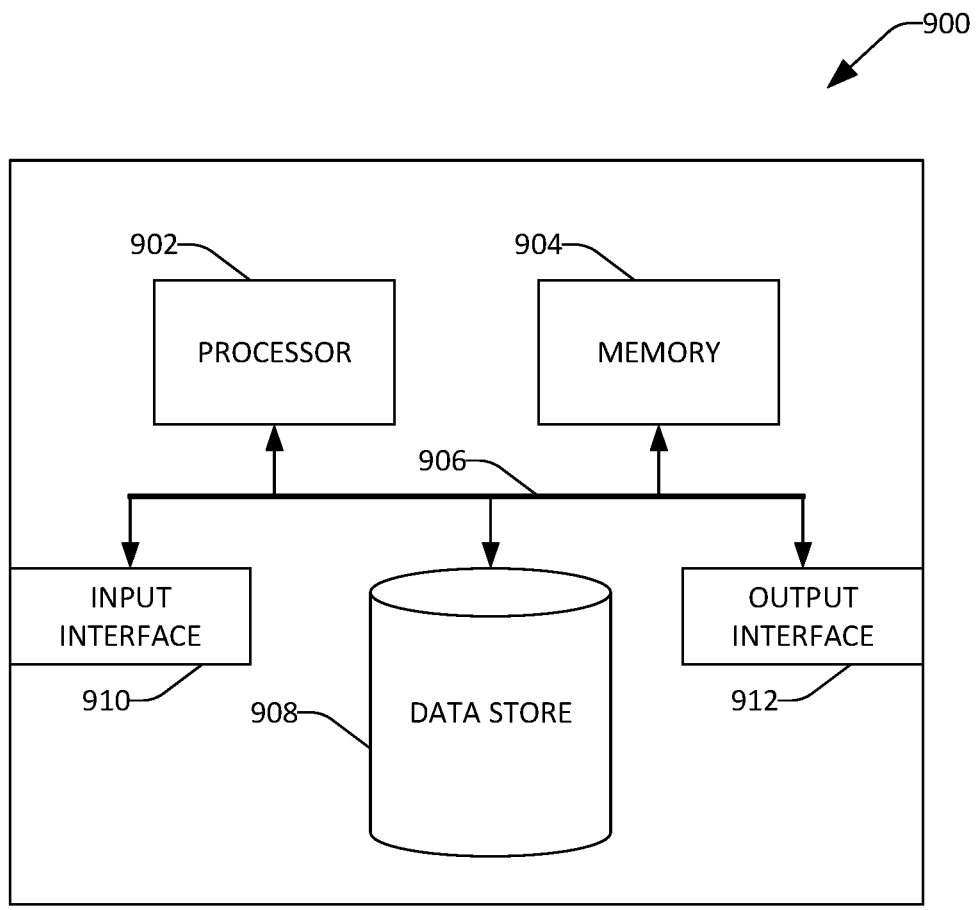
FIG. 9 is an exemplary computing system.

Referring now to FIG. 9, a high-level illustration of an exemplary computing device 900 that can be used in accordance with the systems and methodologies disclosed herein is illustrated. For instance, the computing device 900 may be used in a system that is configured to generate SNC images. By way of another example, the computing device 900 can be used in a system that is configured to generate SAR images and/or CCD images. The computing device 900 includes at least one processor 902 that executes instructions that are stored in a memory 904. The instructions may be, for instance, instructions for implementing functionality described as being carried out by one or more components discussed above or instructions for implementing one or more of the methods described above. The processor 902 may access the memory 904 by way of a system bus 906. In addition to storing executable instructions, the memory 904 may also store images, mean and variance estimates, etc.

The computing device 900 additionally includes a data store 908 that is accessible by the processor 902 by way of the system bus 906. The data store 908 may include executable instructions, images, etc. The computing device 900 also includes an input interface 910 that allows external devices to communicate with the computing device 900. For instance, the input interface 910 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

It is contemplated that the external devices that communicate with the computing device 900 via the input interface 910 and the output interface 912 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 900 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processor Units (GPUs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system comprising:
   a radar system, the radar system comprises a transmitter that is configured to emit radar signals and a receiver that is configured to detect radar signals;
   at least one processor; and
   memory that stores instructions that, when executed by the at least one processor, cause the at least one processor to perform acts comprising:
   generating a plurality of synthetic aperture radar (SAR) images of a scene, the SAR images constructed based upon radar signals detected by the receiver of the radar system responsive to the radar signals being emitted by the transmitter towards the scene and reflecting off of the scene;
   generating a plurality of coherency change detection (CCD) images of the scene based upon the plurality of SAR images, wherein each CCD image is constructed based upon a respective pair of SAR images in the plurality of SAR images;
   receiving a new CCD image of the scene, the CCD image of the scene not included in the plurality of CCD images;
   generating a statistically-normalized coherence (SNC) image of the scene based upon the plurality of CCD images and the CCD image, the SNC image comprises pixels that represent locations in the scene, wherein each pixel in the SNC image is assigned a respective value based upon values assigned to pixels in the plurality of CCD images that represent the same location in the scene as the pixel, and further wherein a first pixel in the pixels that represents a first location in the scene is assigned a first value that indicates that activity has occurred at the first location in the scene or that there is a lack of activity at the first location in the scene that is anomalous relative to normal activity patterns at the location in the scene represented in the plurality of CCD images; and causing the SNC image to be displayed on a display of an analyst.

2. The system of claim 1, wherein generating the SNC image comprises:
assigning the first value to the first pixel in the SNC image, wherein assigning the first value to the first pixel in the SNC image comprises:
computing the mean of values of pixels in the plurality of CCD images that represent the first location in the scene; and
assigning the first value to the first pixel in the SNC image based upon the mean of the values of the pixels in the plurality of CCD images that represent the first location in the scene.

3. The system of claim 1, wherein generating the SNC image comprises:
assigning the first value to the first pixel in the SNC image, wherein assigning the first value to the first pixel in the SNC image comprises:
computing the variance of values of pixels in the plurality of CCD images that represent the first location in the scene; and
assigning the first value to the first pixel in the SNC image based upon the variance of the values of the pixels in the plurality of CCD images that represent the first location in the scene.

4. The system of claim 1, wherein generating the SNC image comprises:
assigning the first value to the first pixel in the SNC image, wherein assigning the first value to the first pixel in the SNC image comprises:
computing the mean of values of pixels in the plurality of CCD images that represent the first location in the scene;
computing the variance of the values of the pixels in the plurality of CCD images that represent the first location in the scene; and
assigning the first value to the first pixel in the SNC image based upon the mean of the values of the pixels in the plurality of CCD images that represent the first location in the scene and the variance of the values of the pixels in the plurality of CCD images that represent the first location in the scene.

5. The system of claim 4, wherein the new CCD image comprises a second pixel that represents the first location in the scene, wherein the second pixel is assigned a second value, and wherein assigning the first value to the first pixel in the SNC image further comprises:
determining a difference between the mean value and the second value; and
assigning the first value to the first pixel in the SNC image based upon the difference between the mean value and the second value.

6. The system of claim 5, wherein assigning the first value to the first pixel in the SNC image further comprises:
dividing the difference by the square root of the variance to generate a result; and
assigning the first value to the first pixel in the SNC image based upon the result.

7. The system of claim 6, wherein the first pixel in the SNC image is depicted in a first color when the difference is positive, and wherein the first pixel in the SNC image is depicted in a second color when the difference is negative, the first color being different from the second color.

8. The system of claim 1, wherein the plurality of CCD images comprises at least six CCD images.

9. The system of claim 1, the acts further comprising:
prior to generating the SNC image, registering the plurality of CCD images to one another.

10. The system of claim 1, the acts further comprising:
prior to generating the SNC image, selecting the plurality of CCD images from a larger collection of CCD images, wherein the plurality of CCD images are selected from the larger collection of CCD images based upon times assigned to CCD images in the larger collection of CCD images.

11. A method that facilitates indicating to an analyst that an anomalous alteration has been identified at a location in a scene, the method comprising:
emitting, from a radar system transmitter, radar signals towards the scene as an aircraft that includes the radar system transmitter passes by the scene;
detecting, with a radar system receiver, the radar signals that have reflected off of the scene;
repeating the acts of emitting and detecting for a plurality of passes by the scene;
generating a plurality of synthetic aperture radar (SAR) images of the scene for the plurality of passes by the scene;
generating a plurality of coherence change detection (CCD) images of the scene based upon the plurality of SAR images of the scene, wherein each CCD image is generated based upon a respective pair of SAR images in the plurality of SAR images;
generating a statistically-normalized coherence (SNC) image based upon the plurality of CCD images and a new CCD image, the new CCD image based upon a new pair of SAR images, the SNC image comprises pixels that represent locations in the scene, wherein each pixel in the SNC image is assigned a respective value based upon values assigned to pixels in the plurality of CCD images that represent the same location in the scene as the pixel, and further wherein a first pixel in the SNC image is assigned a first value that indicates that an alteration has occurred at the first location in the scene that is anomalous relative to activity at the location represented in the plurality of CCD images; and
causing the SNC image to be displayed on a display of an analyst.

12. The method of claim 11, wherein the plurality of CCD images comprise at least six CCD images.

13. The method of claim 11, further comprising selecting the plurality of SAR images from a larger collection of SAR images prior to generating the plurality of CCD images, wherein the plurality of SAR images are selected from the larger collection of SAR image based upon timestamps assigned thereto.

14. The method of claim 11, further comprising registering the plurality of CCD images to one another, wherein the plurality of CCD images are registered to one another prior to generating the SNC image.

15. The method of claim 11, wherein generating the SNC image comprises:
assigning the first value to the first pixel in the SNC image, wherein assigning the first value to the first pixel in the SNC image comprises:

computing the mean of values of pixels in the plurality of CCD images that represent the first location in the scene; and
assigning the first value to the first pixel in the SNC image based upon the mean of the values of the pixels in the plurality of CCD images that represent the first location in the scene.

16. The method of claim 11, wherein generating the SNC image comprises:
assigning the first value to the first pixel in the SNC image, wherein assigning the first value to the first pixel in the SNC image comprises:
computing the variance of values of pixels in the plurality of CCD images that represent the first location in the scene; and
assigning the first value to the first pixel in the SNC image based upon the variance of the values of the pixels in the plurality of CCD images that represent the first location in the scene.

17. The method of claim 11, wherein generating the SNC image comprises:
assigning the first value to the first pixel in the SNC image, wherein assigning the first value to the first pixel in the SNC image comprises:
computing the mean of values of pixels in the plurality of CCD images that represent the first location in the scene;
computing the variance of the values of the pixels in the plurality of CCD images that represent the first location in the scene; and
assigning the first value to the first pixel in the image based upon the mean of the values of the pixels in the plurality of CCD images that represent the first location in the scene and the variance of the values of the pixels in the plurality of CCD images that represent the first location in the scene.

18. The method of claim 17, wherein the new CCD image comprises a second pixel that represents the first location in the scene, wherein the second pixel is assigned a second value, and wherein assigning the first value to the first pixel in the SNC image further comprises:
determining a difference between the mean value and the second value; and
assigning the first value to the first pixel in the SNC image based upon the difference between the mean value and the second value.

19. The method of claim 18, wherein assigning the first value to the first pixel in the SNC image further comprises:
dividing the difference by the square root of the variance to generate a result; and
assigning the first value to the first pixel in the SNC image based upon the result.

20. A computer-readable storage medium comprising instructions that, when executed by a processor, cause the processor to perform acts comprising:
receiving a plurality of coherence change detection (CCD) images of a scene, each CCD image in the plurality of CCD images is based upon a respective pair of synthetic aperture radar (SAR) images of the scene;
registering the plurality of CCD images to generate a CCD image stack, wherein pixel (i,j) in each CCD image in the CCD image stack has a respective value and represents the same location in the scene, and further wherein the CCD image stack comprises at least six CCD images;
computing a mean of values of pixels (i,j) of the plurality of CCD images in the CCD image stack;
computing a variance of values of the pixels (i,j) of the plurality of CCD images in the CCD image stack;
subsequent to computing the mean and the variance, receiving a new CCD image;
registering the new CCD image to the plurality of CCD images to align the new CCD image with the plurality of CCD images; and
generating a statistically-normalized coherence (SNC) image responsive to registering the new CCD image with the plurality of CCD images, wherein pixel (i,j) in the SNC image is assigned a value that is based upon the mean and the variance, wherein the value is indicative of activity at the location in the scene represented in the new CCD image that is anomalous relative to activity at the location in the scene represented in the plurality of CCD images.

* * * * *